(12) United States Patent
Heo et al.

(10) Patent No.: US 9,693,227 B2
(45) Date of Patent: Jun. 27, 2017

(54) SYSTEM AND METHOD FOR LIMITING LINKAGE BETWEEN DEVICES USING COMPARISON BETWEEN SERVICE IDENTIFIERS

(71) Applicant: Hyundai Motor Company, Seoul (KR)

(72) Inventors: Keun Hang Heo, Gyeonggi-do (KR); Hwang Jik Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 14/569,732

(22) Filed: Dec. 14, 2014

(65) Prior Publication Data

US 2016/0087980 A1    Mar. 24, 2016

(30) Foreign Application Priority Data

Sep. 23, 2014  (KR) .......................... 10-2014-0127105

(51) Int. Cl.
| | | |
|---|---|---|
| *H04L 29/06* | (2006.01) | |
| *H04W 12/06* | (2009.01) | |
| *H04W 4/04* | (2009.01) | |

(52) U.S. Cl.
CPC ............ *H04W 12/06* (2013.01); *H04W 4/046* (2013.01)

(58) Field of Classification Search
None
See application file for complete search history.

(56) References Cited

U.S. PATENT DOCUMENTS

| | | | | |
|---|---|---|---|---|
| 8,612,582 B2 * | 12/2013 | Dare | ......................... | G06F 8/60 370/352 |
| 2004/0220791 A1 * | 11/2004 | Lamkin | ............ | G06F 17/30017 703/11 |

(Continued)

FOREIGN PATENT DOCUMENTS

| | | |
|---|---|---|
| KR | 2011-0102282 A | 9/2011 |
| KR | 10-2012-0115827 A | 10/2012 |

(Continued)

OTHER PUBLICATIONS

Ershen, Wang; Shufang, Zhang; Qing, Hu; Lifang, Liang. Design of Information Display and Control Instrument Based on SoC for AIS and GPRS Monitoring System. 3rd IEEE Conference on Industriall Electronics and Applications. Pub. Date: 2008. http://ieeexplore.ieee.org/stamp/stamp.jsp?arnumber=4582475.*

(Continued)

*Primary Examiner* — Jeremiah Avery
(74) *Attorney, Agent, or Firm* — Mintz Levin Cohn Ferris Glovsky and Popeo, P.C.; Peter F. Corless

(57) ABSTRACT

A method for limiting linkage between devices may limit linkage between items that do not coincide with each other among items of service identifiers of a first device and a second device by comparing the service identifier of the first device and the service identifier of applications of the second device to each other is provided. The method includes receiving, by a second device, a service identifier transmitted by a first device, comparing, by the second device, the service identifier received from the first device to a service identifier of the second device and requesting, by the second device, to the first device to transmit information determined to be the same item. The method also includes receiving, by the second device, the requested information from the first device, including the item allowing the information provision. Further, the method includes configuring, (Continued)

by the second device, a screen using the requested information and transmitting, by the second device, the configured screen to the first device.

12 Claims, 6 Drawing Sheets

(56) References Cited

U.S. PATENT DOCUMENTS

| | | | |
|---|---|---|---|
| 2006/0242245 A1 | 10/2006 | Christensen | |
| 2009/0077267 A1* | 3/2009 | Alrabady | H04L 67/025 709/249 |
| 2010/0077094 A1* | 3/2010 | Howarter | G06F 17/30017 709/231 |
| 2010/0222939 A1* | 9/2010 | Namburu | G07C 9/00111 701/2 |
| 2010/0253864 A1* | 10/2010 | Fujinawa | G09G 3/3611 348/839 |
| 2012/0100839 A1 | 4/2012 | Christensen | |
| 2013/0185072 A1* | 7/2013 | Huang | G10L 15/30 704/246 |
| 2013/0226371 A1* | 8/2013 | Rovik | H04L 63/102 701/2 |
| 2013/0254831 A1* | 9/2013 | Roach | H04L 63/107 726/1 |
| 2014/0074318 A1 | 3/2014 | Lim | |
| 2014/0123323 A1* | 5/2014 | Jung | H04L 41/5054 726/30 |
| 2014/0188990 A1* | 7/2014 | Fulks | H04L 65/403 709/204 |
| 2014/0280581 A1* | 9/2014 | Hernandez | H04L 29/08072 709/204 |
| 2014/0309870 A1* | 10/2014 | Ricci | H04W 48/04 701/36 |
| 2014/0310788 A1* | 10/2014 | Ricci | B60Q 1/00 726/6 |
| 2014/0328253 A1 | 11/2014 | Lee et al. | |
| 2015/0089623 A1* | 3/2015 | Sondhi | H04L 63/08 726/9 |
| 2015/0308849 A1* | 10/2015 | Sinaguinan | G01C 21/3611 701/430 |
| 2016/0044032 A1* | 2/2016 | Kim | H04L 63/0876 726/5 |

FOREIGN PATENT DOCUMENTS

| | | |
|---|---|---|
| KR | 10-2014-0033673 A | 3/2014 |
| KR | 2014-0036019 A | 3/2014 |
| KR | 2014-0068052 A | 6/2014 |

OTHER PUBLICATIONS

Hirakawa, Go; Kywe, Phyu Phyu; Ito, Kenta; Shibata, Yoshitaka. Co-operative Mobile Sensor Environment using Wireless Plug and Play Network. 2014 Eighth International Conference on Complex, Intelligent and Software Intensive Systems (CISIS). http://ieeexplore.ieee.org/stamp/stamp.jsp?arnumber=6915507.*

* cited by examiner

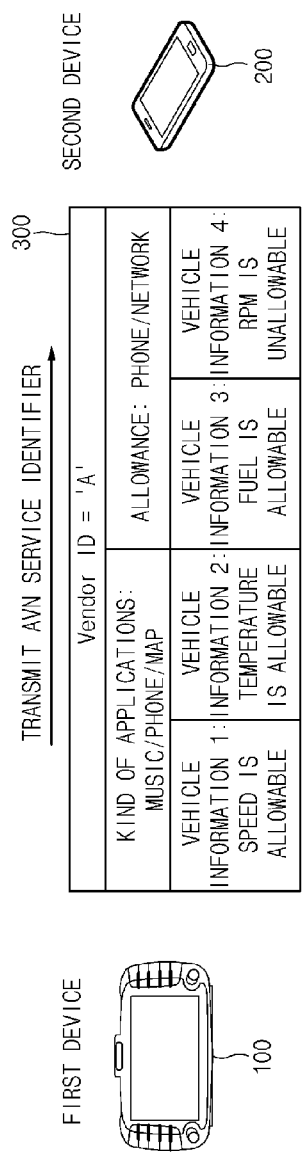
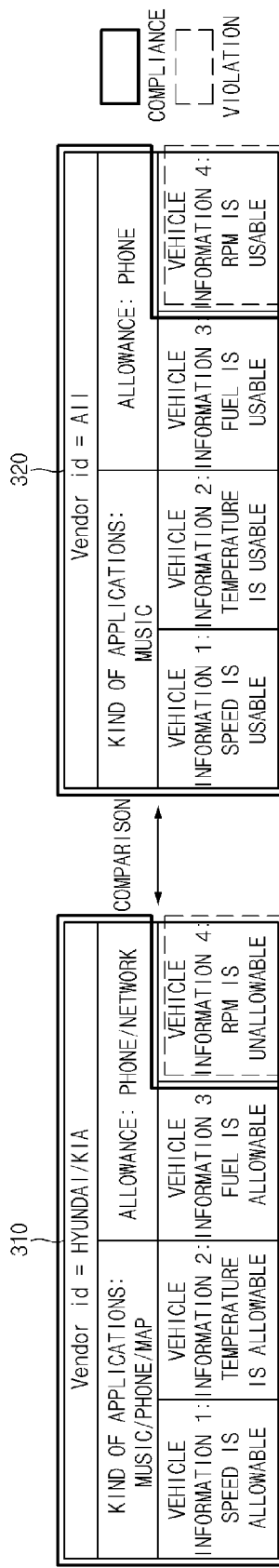
Fig. 1A
Fig. 1B

REQUEST FIRST DEVICE TO TRANSMIT INFORMATION ALLOWED BY AVN, SUCH AS SPEED/TEMPERATURE/FUEL, AND THE LIKE

TRANSMIT INFORMATION ALLOWED BY AVN, SUCH AS SPEED/TEMPERATURE/FUEL, AND THE LIKE

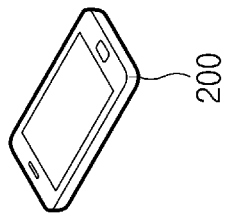
Fig.1E
TRANSMIT CONFIGURED SCREEN
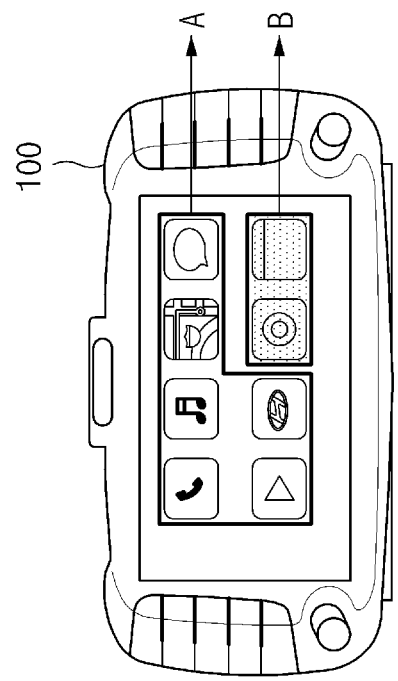
Fig.1F
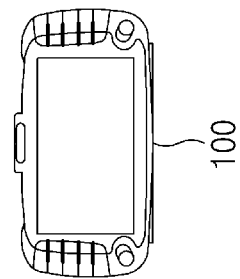

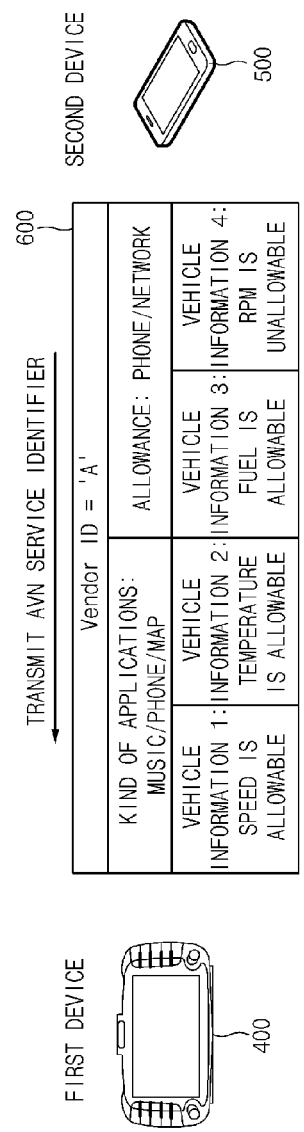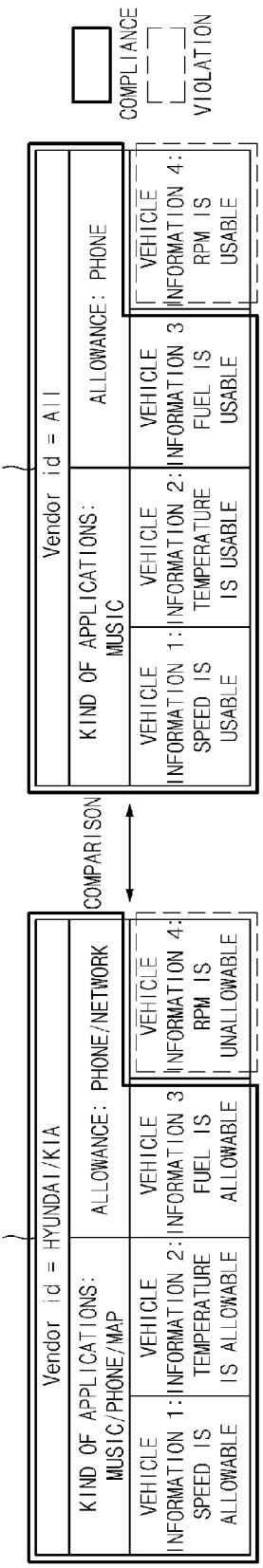
Fig. 2A
Fig. 2B

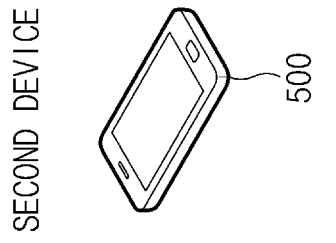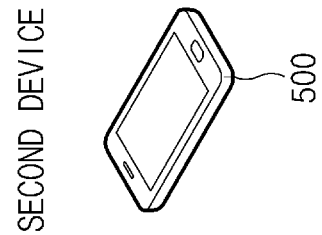
REQUEST FIRST DEVICE TO TRANSMIT INFORMATION ALLOWED BY AVN, SUCH AS SPEED/TEMPERATURE/FUEL, AND THE LIKE
Fig.2C
TRANSMIT INFORMATION ALLOWED BY AVN, SUCH AS SPEED/TEMPERATURE/FUEL, AND THE LIKE
Fig.2D
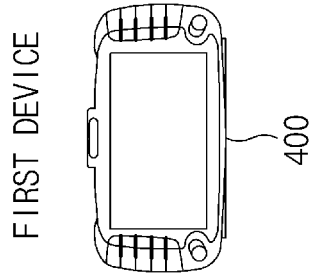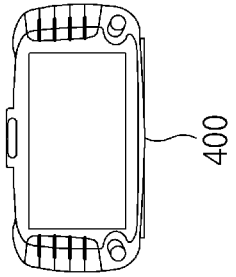

SECOND DEVICE

TRANSMIT CONFIGURED SCREEN

FIRST DEVICE

SYSTEM AND METHOD FOR LIMITING LINKAGE BETWEEN DEVICES USING COMPARISON BETWEEN SERVICE IDENTIFIERS

CROSS-REFERENCE TO RELATED APPLICATION(S)

Pursuant to 35 U.S.C. §119(a), this application is based on and claims priority to Korean Patent Application No. 10-2014-0127105, filed on Sep. 23, 2014, the disclosure of which is incorporated herein in its entirety by reference.

TECHNICAL FIELD

The present disclosure relates to a method for limiting linkage between devices using a comparison between service identifiers, and more particularly, to a technology of comparing a service identifier of a first device and a service identifier of applications of a second device to each other.

BACKGROUND

Recently, mobile communication networks have provided reliable service between users using both wired and wireless technologies when transmitting audio and data communications, and the like. There is, however a demand for greater security service between communicating devices. As a part of this demand, in a mobile communication network environment, authentication of a user terminal has been developed using user terminal device identification information to prevent unauthorized use of an illegal terminal such as a stolen terminal, a duplicated terminal, or the like.

Generally, access management systems have been used to authenticate user terminals Such an access management system, which manages user terminal access to any server, generally manages a white list (e.g., a list of terminals or devices allowed access to a server) and a black list (e.g., a list of terminals or devices with blocked access to a server). The access management system should frequently update or manage the white list and the black list to manage linkage between terminals (e.g., devices) and also manage applications developed by various manufacturers. Further, in an access management system, due to a limited processing capacity of a server, when access requests from multiple terminals equal or exceed a predetermined level, the server may not process access requests, therefore greater numbers of servers may be required to handle demand. Currently the number of servers in a network is increased in address this problem, however an increase in the number of servers increases costs.

SUMMARY

The present disclosure provides a method for limiting linkage between devices by limiting linkage between items that do not coincide with each other among items of service identifiers of a first device and a second device by comparing the service identifier of the first device to the service identifier of applications of the second device.

Other objects and advantages of the present disclosure may be understood by the following description and will be more clearly appreciated by exemplary embodiments of the present disclosure. It may be easily appreciated that objects and advantages of the present disclosure may be realized by means mentioned in the claims and a combination thereof.

According to an exemplary embodiment of the present disclosure, a method for limiting linkage between devices using a comparison between service identifiers may include: transmitting, by a first device, a service identifier to a second device; comparing, by the second device, the service identifier received from the first device to a service identifier of the second device; requesting, by the second device, the first device to transmit information including an item allowing information provision in the service identifier of the first device; transmitting, by the first device, the requested information including the item allowing the information provision to the second device; configuring, by the second device, a screen using the requested information including the item allowing the information provision; transmitting, by the second device, the configured screen to the first device. The method may further include reproducing, by the first device, the received configured screen.

In the comparison of the service identifier received from the first device to the service identifier of the second device, whether the item allowing the information provision among items of the service identifier of the first device and an item allowing use among items of the service identifier of the second device coincide (comply) may be determined. The first device may be an audio video/navigation (AVN) device, and a second device may be a smart device. The service identifier may include, but is not limited to a Vendor identification (ID), an application, and vehicle information. The item allowing the information provision may be an information determining application displayed on the first device and based on the first device.

Additionally, a method for limiting linkage between devices using a comparison between service identifiers may include: transmitting, by a second device, a service identifier to a first device; comparing, by the first device, the service identifier received from the second device to a service identifier of the first device; requesting, by the second device, the first device to transmit information including an item allowing information provision in the service identifier of the first device; transmitting, by the first device, the requested information including the item allowing the information provision to the second device; configuring, by the second device, a screen using the requested information including the item allowing the information provision; transmitting, by the second device, the configured screen to the first device; and reproducing, by the first device, the received configured screen.

In the comparison of the service identifier received from the second device to the service identifier of the first device, may be determined based on the first device, whether the item allowing the information provision among items of the service identifier of the first device and an item allowing use among items of the service identifier of the second device coincide (e. g. comply) with each other or do not coincide (e.g., violate) with each other. The first device may be an audio/video/navigation (AVN) device, and a second device may be a smart device. The service identifier may include, but is not limited to: a Vendor ID, an application, and vehicle information. The item allowing the information provision may be information that determines applications that are displayed on the first device based on the first device.

BRIEF DESCRIPTION OF THE DRAWINGS

The above and other objects, features and advantages of the present disclosure will be more apparent from the following detailed description taken in conjunction with the accompanying drawings, in which:

FIGS. 1A to 1F are exemplary views for describing a method for limiting linkage between first and second devices using a comparison between service identifiers according to an exemplary embodiment of the present disclosure; and FIGS. 2A to 2F are exemplary views for describing a method for limiting linkage between first and second devices using a comparison between service identifiers according to an exemplary embodiment of the present disclosure.

DETAILED DESCRIPTION

Figure 1C:
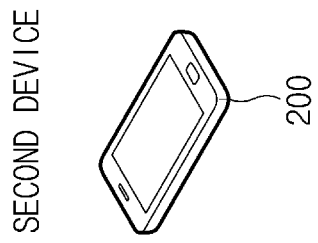

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, when determining that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

In exemplary embodiments of the present disclosure, a linkage service technology or a connectivity technology between the respective devices will be described. Particularly, a description will be provided on the assumption that a first device is an audio/video/navigation (AVN) device and a second device is a smart phone, however such description is merely for explanation and other types of devices are contemplated and within the scope of the present invention. The first device may include display devices disposed within a vehicle, and the second device may include a smart device such as a smart phone, a smart pad, tablet computer, and the like. The first and second devices may be connected via a communication technology such as, but not limited to: universal serial bus (USB), Bluetooth, Wifi, or the like.

FIGS. 1A to 1F are exemplary views for describing a method for limiting linkage between first and second devices using a comparison between service identifiers according to an exemplary embodiment of the present disclosure. Referring to FIG. 1A, the first device 100 may be configured to transmit a service identifier (SID) 300 to the second device 200. In particular, the service identifier 300 may include information including applications that may be displayed on a display of the AVN device. The service identifier 300, which may include information possessed by the AVN device and applications of a smart phone, may be information used in determining applications that may be displayed on a screen when the smart phone configures the screen.

In particular, the AVN device may include a service identifier having features of applications that may be displayed on the AVN device, and the applications of the smart phone may include a service identifier including, but not limited to: applications that may be driven in the AVN device, other types of applications, and vehicle information in which the applications are used, and the like. For example, the service identifier 300 may include a Vendor ID, a type of application, and allowable or unallowable vehicle information. The vendor ID may indicate a manufacturer name of a vehicle currently including the AVN device, such as Hyundai, Kia, or GM. In addition, the type of applications may include, but is not limited to: a music file, a phone, a map, and the like, and may refer to applications that may reproduce the music, make a phone call, or display the map. In addition, the vehicle information may include speed information, temperature information, fuel information, rpm information, or the like, of the vehicle.

Referring to FIG. 1B, the second device 200 may be configured to compare a service identifier 310 received from the first device 100 and a service identifier 320 of the second device 200 to each other. For example, it may be assumed that in the service identifier 310 of the first device 100, e.g., a Vendor ID defined as Hyundai/Kia, and a type of application may include a music file, a phone, a map, and the like, while allowable vehicle information may include speed information, temperature information and fuel information of the vehicle, and unallowable vehicle information may include, but is not limited to revolution per minute (rpm) information of the vehicle.

Furthermore, in the service identifier 320 of the second device 200, a Vendor ID may be defined as all manufacturers of vehicles (here, denoted by 'All'), a type of applications may include a music file, and usable vehicle information may include speed information, temperature information, fuel information, and rpm information of the vehicle. However, the rpm information of the vehicle, which may be allowable vehicle information in the service identifier 320 of the second device 200, and the rpm information of the vehicle, which may be the unallowable vehicle information in the service identifier 310 of the first device 100, may be compared to exclude information in which an item (e.g., a violation item) different from that of the service identifier 310 of the first device 100 is present from a screen configuration of the applications of the smart phone.

Particularly, the service identifier 320 of the applications of the smart phone of the second device 200 may be compared to the service identifier 310 of the first device 100 to classify items of the service identifier 320 into a service-enabled item (e.g., an item that allows information provision in the first device) or a service-disabled item (e.g., an item that does not allow information provision in the first device) and exclude an application in which the service-disabled item is present from the screen configuration.

Figure 1D:
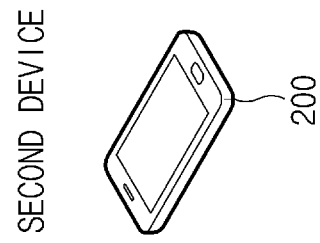

Referring to FIGS. 1C and 1D, the second device 200 may be configured to request the first device 100 to transmit the information determined to be the service-enabled item by the second device 200, and the first device 100 may be configured to transmit the information requested by the second device 200. The first device 100 may be configured to transmit the speed information, the temperature information, and the fuel information of the vehicle to the second device 200.

Referring to FIG. 1E, the second device 200 may be configured to reconfigure the screen to include applications in which the service-disabled item is not present and then transmit again a configured screen to the first device 100.

Referring to FIG. 1F, the first device 100 may be configured to reproduce the configured screen to comply with the content of the service identifier of the first device 100. In other words, the applications included in the first device 100 may be classified into applications A, that is included in the screen configuration by complying with the content of the service identifier of the first device 100 and applications B, that is not included in the screen configuration by violating the content of the service identifier of the first device 100.

Figure 2E:
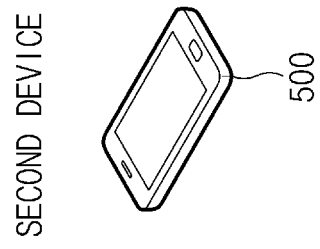

FIGS. 2A to 2F are exemplary views for describing a method for limiting linkage between first and second devices using a comparison between service identifiers according to another exemplary embodiment of the present disclosure. Referring to FIG. 2A, the second device 500 may be configured to transmit an AVN service identifier to the first device 400. In particular, the service identifier 600, which may include information possessed by the AVN device and applications of a smart phone, may be information or a message used in determining applications that may be displayed on a screen when the smart phone configures the screen.

The AVN device may include the service identifier 600 having features of applications that may be displayed on the AVN device, and the applications of the smart phone may include the service identifier 600 including applications that may be driven in the AVN device, a type of application, vehicle information in which the applications are used, and the like. For example, the service identifier 600 may include a Vendor ID, a type of application, and allowable or unallowable vehicle information. The vendor ID may indicate a manufacturer name of a vehicle currently including the AVN device, such as Hyundai, Kia, or GM. The type of application may include a music file, a phone, a map, and the like, and applications that may reproduce the music, make a phone call, or display the map. The vehicle information may include speed information, temperature information, fuel information, or rpm information of the vehicle.

Referring to FIG. 2B, the second device 500 may be configured to compare a service identifier 610 received from the first device 400 and a service identifier 620 of the second device 500. For example, in the service identifier 610 of the first device 400, a Vendor ID may be defined as Hyundai/Kia, a type of application may include a music file, a phone, a map, and the like, allowable vehicle information may include speed information, temperature information and fuel information of the vehicle, and unallowable vehicle information may include rpm information of the vehicle.

However, in the service identifier 620 of the second device 500, a Vendor ID may be defined as all manufacturers of vehicles (here, denoted by 'All'), a type of applications may include a music file, usable vehicle information may include speed information, temperature information, and fuel information of the vehicle, and unusable vehicle information may include rpm information of the vehicle. The unusable vehicle information may be unusable since the unusable vehicle information may be defined as the rpm information of the vehicle, which may be the unallowable vehicle information as compared to the service identifier 610 of the first device 400, and information in which an item (e.g., a violation item) different from that of the service identifier 610 of the first device 400 is present may be excluded from a screen configuration of the applications of the smart phone.

The service identifier 620 of the applications of the smart phone of the second device 500 may be compared to the service identifier 610 of the first device 400 to classify items of the service identifier 320 into a service-enabled item (e.g., an item that allows information provision in the first device) or a service-disabled item (e.g., an item that does not allow information provision in the first device) and exclude an application in which the service-disabled item is present from the screen configuration.

Referring to FIGS. 2C and 2D, the second device 500 may be configured to request the first device 400 to transmit the information determined to be the service-enabled item by the second device 500, and the first device 400 may be configured to transmit the information requested by the second device 500.

Referring to FIG. 2E, the second device 500 may be configured to configure the screen to include applications in which the service-disabled item is not present and then transmit again a configured screen to the first device 400.

Figure 2F:
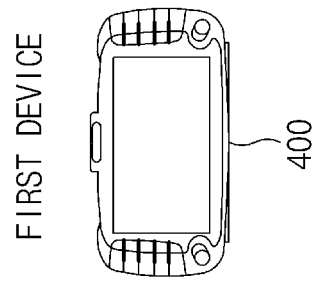
Figure 2F:
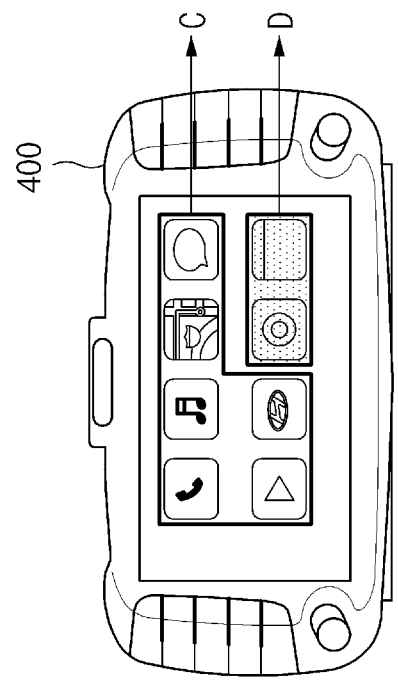

Referring to FIG. 2F, the first device 400 may be configured to reproduce the configured screen to comply with a content of the service identifier of the first device 400. In other words, the applications included in the first device 400 may be classified into applications C, that is included in the screen configuration by complying with the content of the service identifier of the first device 400 and applications D, that is not included in the screen configuration by violating the content of the service identifier of the first device 400.

As described above, according to exemplary embodiments of the present invention, management of a server storing or maintaining a white list or a black list of the first device (AVN device) may not be required, and a server does may be omitted. In addition, according to exemplary embodiments of the present invention, a process of managing the applications of the first device (AVN device), may be avoided. Further, according to exemplary embodiments of the present invention, an effort to develop a code through which the first device (AVN device) accesses the server may be omitted.

Hereinabove, although the present disclosure has been described with reference to restrictive configurations and the accompanying drawings, the present disclosure is not limited thereto, but may be variously modified and altered by those skilled in the art to which the present disclosure pertains without departing from the spirit of the present disclosure and equivalents to the following claims.

What is claimed is:

1. A method for limiting linkage between devices using a comparison between service identifiers, comprising:
    transmitting, by a first device, a service identifier to a second device;
    comparing, by the second device, the service identifier received from the first device with a service identifier of the second device;
    requesting, by the second device, the first device to transmit information including an item allowing information provision in the service identifier of the first device;
    transmitting, by the first device, the requested information including the item allowing the information provision to the second device;
    configuring, by the second device, a screen using the requested information including the item allowing the information provision;
    transmitting, by the second device, the configured screen to the first device; and
    reproducing, by the first device, the received configured screen,
    wherein the comparing of the service identifier received from the first device with the service identifier of the second device includes:
    determining, based on the first device, whether the item allowing the information provision among items of the service identifier of the first device coincides with an item allowing use among items of the service identifier of the second device.

2. The method for limiting linkage between devices using a comparison between service identifiers according to claim 1, wherein the first device includes an audio/video/navigation (AVN) device, and a second device includes a smart device.

3. The method for limiting linkage between devices using a comparison between service identifiers according to claim 1, wherein the item allowing the information provision includes an information determining application configured to be displayed on the first device based on the first device.

4. A method for limiting linkage between devices using a comparison between service identifiers, comprising:
    receiving, by a first device, a service identifier to a first device;
    comparing, by the first device, the service identifier received from a second device to a service identifier of the first device;
    receiving, by the first device, device request to transmit information including an item allowing information provision in the service identifier of the first device;
    transmitting, by the first device, the requested information including the item allowing the information provision to the second device;
    receiving, by the second device, a configured screen to the first device, configured using the requested information including the item allowing the information provision; and
    reproducing, by the first device, the received configured screen,
    wherein the comparing of the service identifier received from the second device to the service identifier of the first device includes:
    determining, based on the first device, whether the item allowing the information provision among items of the service identifier of the first device coincides with an item allowing use among items of the service identifier of the second device.

5. The method for limiting linkage between devices using a comparison between service identifiers according to claim 4, wherein the first device includes an audio/video/navigation (AVN) device, and a second device includes a smart device.

6. The method for limiting linkage between devices using a comparison between service identifiers according to claim 4, wherein the item allowing the information provision includes information determining application configured to be displayed on the first device based on the first device.

7. A non-transitory computer readable medium containing program instructions executed by a processor for limiting linkage between devices using a comparison between service identifiers, the computer readable medium comprising:
    program instructions that operate a second device to receive a service identifier transmitted by a first device;
    program instructions that operate the second device to compare the service identifier received from the first device to a service identifier of the second device;
    program instructions that operate the second device to request the first device to transmit information including an item allowing information provision in the service identifier of the first device;
    program instructions that operate the second device to receive the requested information from the first device including the item allowing the information provision;
    program instructions that operate the second device to configure a screen using the requested information including the item allowing the information provision; and
    program instructions that operate the second device to transmit the configured screen to the first device,
    wherein the program instructions that operate the second device to compare the service identifier received from the first device to the service identifier of the second device includes:
    program instructions that operate the second device to determine, based on the first device, whether the item allowing the information provision among items of the service identifier of the first device coincides with an item allowing use among items of the service identifier of the second device.

8. The non-transitory computer readable medium of claim 7, further comprising:
    program instructions that operate the first device to reproduce the received configured screen.

9. The non-transitory computer readable medium according to claim 7, wherein the first device includes an audio/video/navigation (AVN) device, and a second device includes a smart device, and
    wherein the item allowing the information provision includes an information determining application configured to be displayed on the first device based on the first device.

10. A system for limiting linkage between devices using a comparison between service identifiers, comprising:
    a memory configured to store program instructions; and a controller configured to execute the program instructions, the program instructions when executed configured to:

operate a first device to transmit a service identifier to a second device;

operate a second device to compare the service identifier received from the first device with a service identifier of the second device;

operate a second device to request the first device to transmit information including an item allowing information provision in the service identifier of the first device;

operate a first device to transmit the requested information including the item allowing the information provision to the second device;

operate the second device to configure a screen using the requested information including the item allowing the information provision;

operate the second device to transmit the configured screen to the first device; and operate a first device to reproduce the received configured screen, wherein the comparison of the service identifier received from the first device to the service identifier of the second device includes:

determining, based on the first device, whether the item allowing the information provision among items of the service identifier of the first device coincides with an item allowing use among items of the service identifier of the second device.

11. The system according to claim 10, wherein the first device includes an audio/video/navigation (AVN) device, and a second device includes a smart device.

12. The system according to claim 10, wherein the item allowing the information provision includes an information determining application configured to be displayed on the first device based on the first device.

* * * * *